United States Patent
Bert (10) Patent No.: US 8,527,698 B2
(45) Date of Patent: Sep. 3, 2013

(54) PARITY-BASED RAID SYSTEM CONFIGURED TO PROTECT AGAINST DATA CORRUPTION CAUSED BY THE OCCURRENCE OF WRITE HOLES

(75) Inventor: Luca Bert, Cumming, GA (US)

(73) Assignee: LSI Corporation, Milpitas, CA (US)

( * ) Notice: Subject to any disclaimer, the term of this patent is extended or adjusted under 35 U.S.C. 154(b) by 232 days.

(21) Appl. No.: 12/963,048

(22) Filed: Dec. 8, 2010

(65) Prior Publication Data
US 2011/0314218 A1 Dec. 22, 2011

Related U.S. Application Data

(60) Provisional application No. 61/357,176, filed on Jun. 22, 2010.

(51) Int. Cl.
*G06F 3/00* (2006.01)
*G06F 12/00* (2006.01)

(52) U.S. Cl.
USPC .......... 711/114; 710/5; 710/39; 711/103; 711/12.001

(58) Field of Classification Search
USPC .......... 710/5, 39; 711/103, 114, 12.001
See application file for complete search history.

(56) References Cited

U.S. PATENT DOCUMENTS

| 7,725,558 B2 * | 5/2010 | Dickenson ............. 709/215 |
| 2012/0011283 A1 * | 1/2012 | Freking et al. ............. 710/5 |
| 2012/0226853 A1 * | 9/2012 | Bert ............. 711/114 |

* cited by examiner

*Primary Examiner* — Reginald Bragdon
*Assistant Examiner* — Mehdi Namazi
(74) *Attorney, Agent, or Firm* — Daniel J. Santos (57) ABSTRACT

A RAID system is provided in which the RAID controller of the system causes a predetermined number, N, of IO commands to be queued in a memory element, where N is a positive integer. After the N IO commands have been queued, the RAID controller writes N locks associated with the N IO commands in parallel to a service memory device. The RAID controller then writes N stripes of data and parity bits associated with the N IO commands to the PDs of the system to perform striping and parity distribution. If a catastrophic event, such as a power failure, occurs, the RAID controller reads the locks from the service memory device and causes parity to be reconstructed for the stripes associated with the locks. These features improve write performance while preventing the occurrence of data corruption caused by write holes.

16 Claims, 5 Drawing Sheets

PARITY-BASED RAID SYSTEM CONFIGURED TO PROTECT AGAINST DATA CORRUPTION CAUSED BY THE OCCURRENCE OF WRITE HOLES

CROSS-REFERENCE TO RELATED APPLICATIONS

This application is a nonprovisional application claiming the benefit of the priority date of U.S. provisional application Ser. No. 61/357,176, filed on Jun. 22, 2010, entitled "METHOD TO AVOID RAID 5 WRITE HOLE IN SYSTEMS WITHOUT NVRAM OR EQUIVALENT BACKED UP RAM SYSTEMS", which is incorporated herein by reference in its entirety.

TECHNICAL FIELD OF THE INVENTION

The invention relates generally to storage systems that implement Redundant Array of Inexpensive Disks (RAID) technology. More particularly, the invention relates to a parity-based RAID system and method for protecting against data corruption caused by the occurrence of write holes.

BACKGROUND OF THE INVENTION

A storage array or disk array is a data storage device that includes multiple disk drives or similar persistent storage units. A storage array can allow large amounts of data to be stored in an efficient manner. A storage array also can provide redundancy to promote reliability, as in the case of a RAID system. In general, RAID systems simultaneously use two or more hard disk drives, referred to herein as physical disk drives (PDs), to achieve greater levels of performance, reliability and/or larger data volume sizes. The phrase "RAID" is generally used to describe computer data storage schemes that divide and replicate data among multiple PDs. In RAID systems, one or more PDs are set up as a RAID virtual disk drive (VD). In a RAID VD, data might be distributed across multiple PDs, but the VD is seen by the user and by the operating system of the computer as a single disk. The VD is "virtual" in that storage space in the VD maps to the physical storage space in the PDs, but the VD usually does not itself represent a single physical storage device.

Although a variety of different RAID system designs exist, all have two key design goals, namely: (1) to increase data reliability and (2) to increase input/output (I/O) performance. RAID has seven basic levels corresponding to different system designs. The seven basic RAID levels are typically referred to as RAID levels 0-6. RAID level 5 uses striping in combination with distributed parity. The term "striping" means that logically sequential data, such as a single data file, is fragmented and assigned to multiple PDs in a round-robin fashion. Thus, the data is said to be "striped" over multiple PDs when the data is written. The term "distributed parity" means that the parity bits that are calculated for each stripe of data are distributed over all of the PDs rather than being stored on one or more dedicated parity PDs. Striping improves performance because the data fragments that make up each data stripe are written in parallel to different PDs and read in parallel from the different PDs. Distributing the parity bits also improves performance in that the parity bits associated with different data stripes can be written in parallel to different PDs using parallel write operations as opposed to having to use sequential write operations to a dedicated parity PD. In order to implement distributed parity, all but one of the PDs must be present for the system to operate. Failure of any one of the PDs necessitates replacement of the PD, but does not cause the system to fail. Upon failure of one of the PDs, any subsequent reads can be calculated from the Distributed parity such that the PD failure is masked from the end user. If a second one of the PDs fails, the system will suffer a loss of data, and the system is vulnerable until the data that was on the failed PD is reconstructed on a replacement PD.

Figure 1:
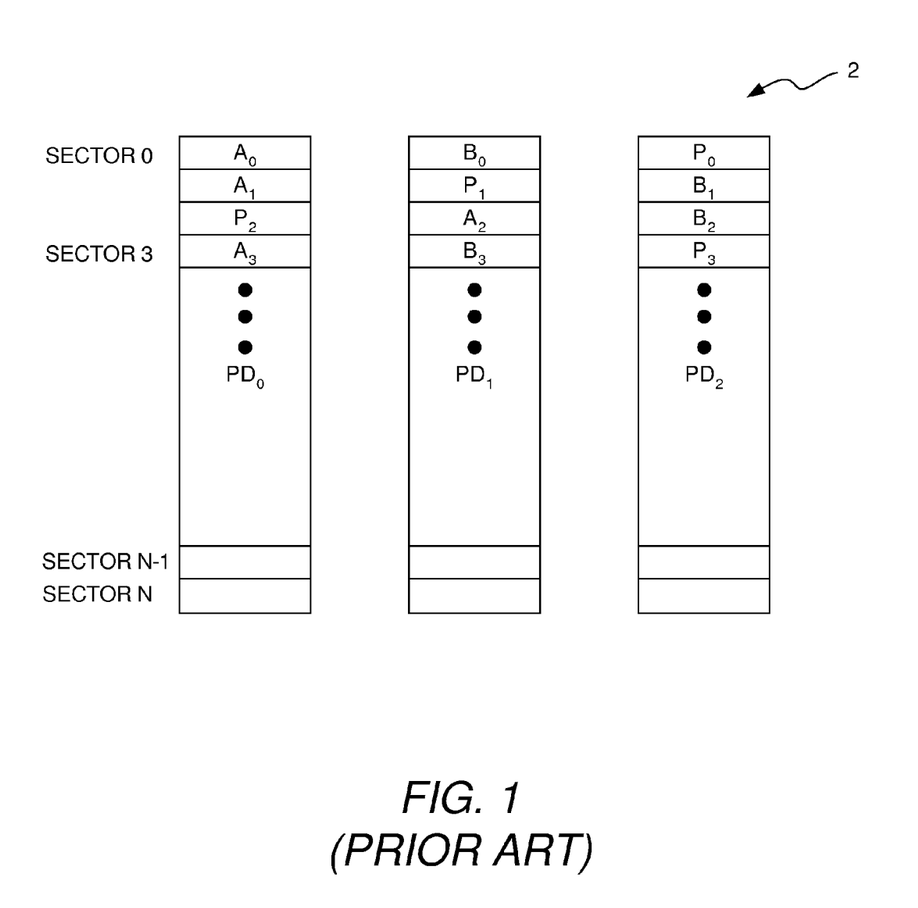
FIG. 1 illustrates a block diagram of a typical RAID array of a RAID level 5 system.

One of the well-documented problems of RAID systems that use parity (i.e., RAID systems that use RAID levels 3-6) is that they are susceptible to the occurrence of write holes, which can result in data corruption. Write holes are possible due to the lack of atomicity, i.e., multiple writes per stripe are needed to write the data and the associated parity bits. The manner in which a write hole can result in data corruption will now be described with reference to the block diagram shown in FIG. 1. FIG. 1 is a block diagram of a RAID level 5 array 2 having multiple PDs, namely, $PD_0$, $PD_1$ and $PD_2$. Each stripe of data is made up of an A data fragment and a B data fragment. For each A and B data fragment, parity bits, P, are computed by performing an exclusive OR operation that exclusive ORs the A data fragment with the B data fragment. As can be seen in FIG. 1, the P blocks are distributed across all of PDs, $PD_0$, $PD_1$ and $PD_2$, to provide distributed parity. The P bits are calculated by reading the data fragments A and B and performing the operations represented by the equation: A XOR B=P. The P bits are then written to one of $PD_0$, $PD_1$ or $PD_2$. If one of $PD_0$, $PD_1$ and $PD_2$ fails, the data in the failed PD can be reconstructed by using the parity bits and the data from the non-failing PDs in accordance with the following equations: A=B XOR P, B=A XOR P and P=A XOR B.

An example of the manner in which a write hole may result in data corruption will now be described with reference to sector 3 of the RAID level 5 array 2. For purposes of this example, it will be assumed that (1) during the process of updating the B data fragment of sector 3, $B_3$, a power failure occurs so that $B_3$ is incompletely written, and (2) $PD_0$ fails at some point in time after power to the system has been restored. When $PD_0$ fails, the RAID reconstruction algorithm will attempt to reconstruct the data of $PD_0$ using the data and parity bits from $PD_1$ and $PD_2$. Due to the occurrence of the power failure, the parity bits $P_3$ will be inconsistent with the data fragment $B_3$. For this reason, the data that was stored in $PD_0$ will not be properly reconstructed. It should be noted that this would systematically result in a silent data corruption, meaning that the storage subsystem has no way to detect or correct the inconsistency.

A variety of techniques have been used or proposed to reduce or eliminate the potential for data corruption to be caused by the occurrence of a write hole. Most of the known or proposed techniques involve setting a lock in a nonvolatile random access memory (NVRAM) element immediately before a stripe is written and removing the lock from the NVRAM element immediately after the stripe is been written. A RAID controller sets and removes the locks. The NVRAM element is typically part of the RAID controller. The lock identifies the addresses in the PDs that are allocated to the stripe. Just prior to the first data fragment of the stripe being written, the lock is set. Just after the last bit of the stripe has been written, the lock is removed. If a catastrophic event such as a power failure occurs, upon reboot, the RAID controller reads the contents of the NVRAM element and identifies all existing locks. Then, the RAID controller re-computes the parity bits for all of the stripes that were locked at the time that the power failure occurred. This technique of locking and unlocking stripes ensures that parity bits and/or data that were potentially corrupted due to the power failure are re-computed so as to be consistent with the data should the need to reconstruct other data in the same stripe arise.

One of the disadvantages of the technique described above is that the local NVRAM element is relatively expensive and represents a significant portion of the cost of a parity-based RAID system. Another disadvantage of this approach is that it does not work in cases where the RAID controller has failed and needs to be replaced. These disadvantages can be overcome by replacing the NVRAM element with some other type of storage medium, such as, for example, one of the PDs or a solid-state flash memory element that is local to the RAID controller. These other solutions, however, also have drawbacks. If the lock is stored in a reserve area of one of the PDs, the number of accesses to the PD per stripe will increase from four to six, i.e., one read to get the old data, one read to get the old parity (both necessary to compute the new parity), one write to write the data, one write to write the parity bits, one write to set the lock and one write to remove the lock. The additional writes would effectively reduce the write performance of the RAID system by one third.

Storing the lock in a flash memory element that is local to the RAID controller would be faster than storing the lock in a reserve area of one of the PDs, and therefore would provide much better write performance. However, flash memory elements have limited life expectancies when measured in terms of Program/Erase (P/E) cycles. Typically flash memory elements have life expectancies of about 10,000 to 100,000 P/E cycles. Because a RAID system may have, for example, one hundred thousand input/output transactions (IOs) per second, a flash memory element that is used for this purpose would be exhausted in as little as a few minutes.

Another approach that would avoid the need to use local NVRAM to store locks would be to simply mark the RAID array as "open" at first write and as "closed" after a clean shutdown. In the case of a power failure, upon reboot, the RAID controller would detect that there was not a clean shutdown and would start regenerating parity for all stripes. The main disadvantage of this approach is that parity may have to be regenerated for hundreds of millions or billions of stripes, which could take days or weeks to complete. Therefore, this approach would not be practical from a duration standpoint or from a life-expectancy standpoint.

A need exits for a way to provide write hole protection in a parity-based RAID system that does not require the use of an expensive local NVRAM element in the RAID controller. A need also exists for a way to provide write hole protection in a parity-based RAID system that does not reduce write performance or detrimentally impact storage device life expectancy.

SUMMARY OF THE INVENTION

The invention provides a RAID system and method for protecting against data corruption caused by write holes while also improving the write performance of the RAID system. The RAID system comprises a RAID controller, a plurality of physical disks (PDs), and a nonvolatile service memory device. The RAID controller comprises a processor and a local memory device. The PDs and the service memory device are in communication with the RAID controller. At least a portion of the local memory device is allocated for use as a queue for queuing N input/output (IO) commands received from a computer that is external to the RAID system, where N is a positive integer. The processor generates a lock associated with each received IO command and causes the received IO commands and the locks to be queued in the local memory device. The processor determines when N IO commands have been queued in the local memory device. When N IO commands have been queued, the processor causes the N respective locks associated with the N respective queued IO commands to be written to lock storage locations of the service memory device. After the N locks have been written to the lock storage locations of the service memory device, the processor causes N respective stripes of data and parity bits to be written to the PDs.

The method comprises the following: receiving IO commands in a RAID controller of a RAID system from a computer that is external to the RAID system; in a processor of the RAID controller, generating a respective lock for each respective IO command received in the RAID controller; in a local memory device of the RAID controller, queuing N of the received IO commands and N of the locks associated with the N IO commands, where N is a positive integer; in the processor of the RAID controller, determining when N IO commands have been queued in the local memory device and then causing the N locks associated with the N queued IO commands to be written to lock storage locations of a service memory device of the RAID system; and in the processor of the RAID controller, after the N locks have been written to the lock storage locations of the service memory device, causing N respective stripes of data and parity bits associated with the N respective IO commands to be written to PDs of the RAID system.

The invention also provides a computer-readable medium (CRM) comprising computer instructions for performing the method described above in the immediately preceding paragraph. First, second, third, fourth, and fifth sets of computer instructions are stored on the CRM. The first set of computer instructions receives IO commands in a RAID controller of the RAID system from a computer that is external to the RAID system. The second set of computer instructions generates a respective lock for each respective IO command received in the RAID controller. The third set of computer instructions queues N of the received IO commands and N of the locks associated with the N IO commands in a local memory device of the RAID controller, where N is a positive integer. The fourth set of instructions determines if N IO commands have been queued in the local memory device, and if so, causes the N locks associated with the N queued IO commands to be written to lock storage locations of a service memory device of the RAID system. After the N locks have been written to the lock storage locations of the service memory device, the fifth set of instructions causes N respective stripes of data and parity bits associated with the N respective IO commands to be written to PDs of the RAID system.

These and other features and advantages of the invention will become apparent from the following description, drawings and claims.

DETAILED DESCRIPTION OF ILLUSTRATIVE EMBODIMENTS

In accordance with the invention, a parity-based RAID system is provided with a configuration that protects the system from the potential for data corruption caused by the occurrence of write holes. In addition, the invention obviates the need to use NVRAM in the RAID controller of the parity-based RAID system without sacrificing performance. Examples of illustrative, or exemplary, embodiments of the parity-based RAID system and methods for use in the system will now be provided with reference to FIGS. 2-5.

In existing parity-based RAID systems, in order for a computer to write data to memory, the operating system (OS) of the computer issues an IO command to the RAID controller of the system. For each issued IO command, the RAID controller then performs the following sequence of actions: (1) it writes a lock to a nonvolatile memory device (e.g., local NVRAM) to lock the stripe; (2) it writes the data of the stripe to the corresponding PDs; (3) it writes the parity bits of the stripe to the corresponding PD; and (4) it writes an unlock to the nonvolatile memory device (typically an NVRAM device) to remove the lock (i.e., unlock the stripe). In other words, one IO command requires four sequential write operations.

In accordance with the invention, when IO commands are issued by the OS, the RAID controller causes a predetermined number, N, of the IO commands to be queued in a memory element, where N is a positive integer. The value of N is generally chosen to achieve a reasonable balance between (a) being large enough to ensure that the data associated with the queued IO commands will fill up an integer number of blocks of data in the PDs, and (b) not being so large as to cause the system to stall, or "hiccup". Typically, but not necessarily, N is equal to the block size divided by the lock size. For example, if each lock is made up of 16 bytes (B) and each block in the PDs is 512 B, then typically N=512 B/16 B=32.

After the N IO commands have been queued, the RAID controller writes the N locks associated with the N IO commands in parallel to a service memory element. The RAID controller then writes N stripes of data and parity bits associated with the N IO commands to the PDs of the system to perform striping and parity distribution in accordance with known RAID parity distribution and striping techniques. A circular buffer preferably is used as the service memory element to eliminate the need to write N unlocks to the service memory to remove the N locks. Thus, while each stripe still will typically require two sequential write operations to write the data and to write the associated parity bits, only one write operation is required to write all N locks. Furthermore, no write operations are needed to remove the locks. Thus, the total number of sequential write operations required for N IO commands has been reduced from 4N (the known approach described above) to 2N+1/N, or approximately 2N. While queuing the IO commands initially causes a small increase in latency for the first set of queued IOs, the improvement in performance obtained through the reduced number of sequential write operations that must be performed over time more than overcomes this initial latency and provides a substantial improvement in performance.

Figure 2:
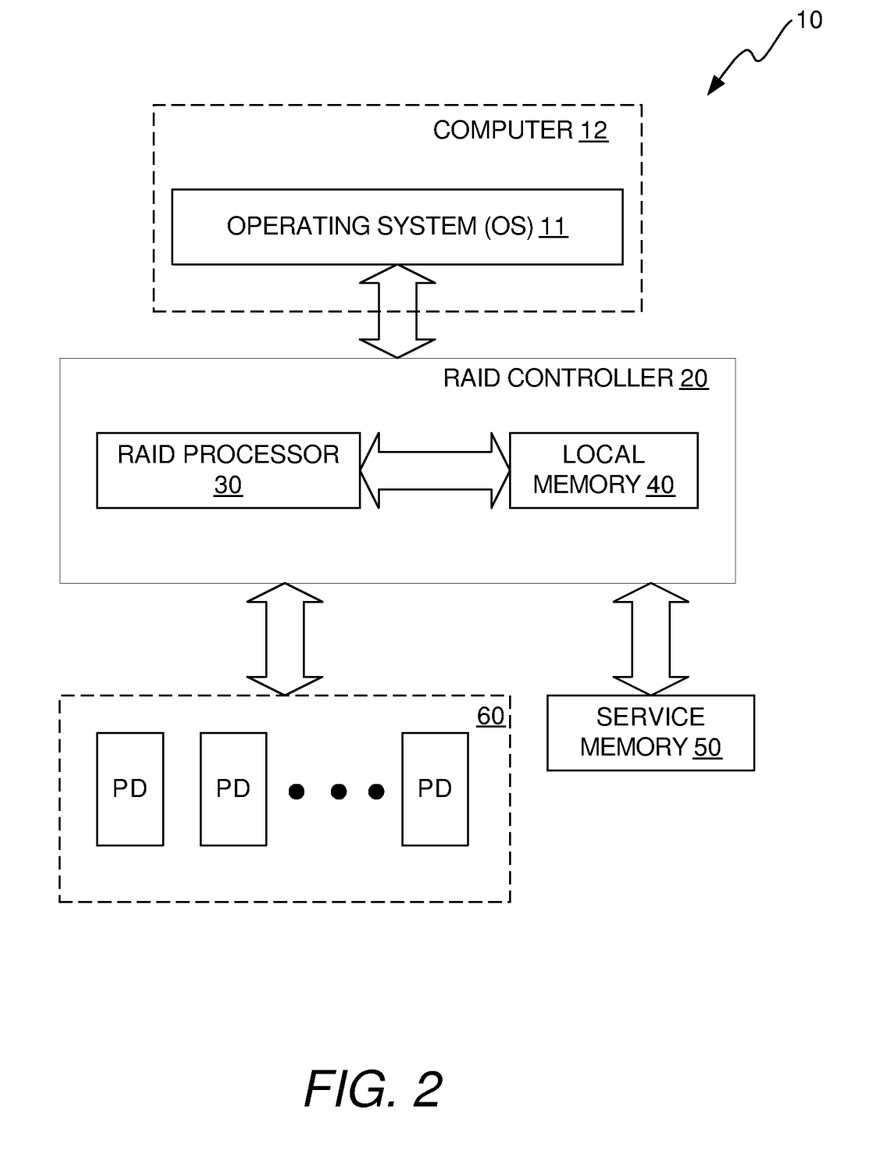
FIG. 2 illustrates a block diagram of a parity-based RAID system that is configured to protect against data corruption caused by the occurrence of write holes.

FIG. 2 illustrates a block diagram of a RAID system 10 in accordance with an illustrative embodiment. A RAID controller 20 of the RAID system 10 receives IO commands from an OS 11 of a computer 12. As the IO commands are received in the RAID controller 20, the RAID processor 30 of the RAID controller 20 causes N of the IO commands to be queued in a local memory device 40 of the RAID controller 20. The local memory device 40 may be, but need not be, a nonvolatile memory device. As the RAID controller 20 receives the IO commands, the RAID processor 30 generates N respective locks, which are also queued in the local memory device 40. Each lock is a multi-byte number (e.g., 16 B) that identifies locations in an array of PDs 60 to which the stripe associated with the lock will be written.

After N IO commands have been queued in the local memory device 40, the RAID controller 20 causes the locks to be written to the service memory device 50, which, in accordance with this illustrative embodiment, is a circular buffer. As indicated above, the N locks are written in parallel during a single write operation. After the locks have been written to the service memory device 50, the RAID controller 20 causes the N stripes associated with the N locks to be written to the PDs 60 in the normal manner in which stripes are written to PDs in a typical RAID level 5 system. Because, the service memory device 50 is a circular buffer, locks that are stored in the service memory device 50 at an earlier point in time will eventually be overwritten at a later point in time with locks associated with the next set of N IO commands queued in the local memory device 40. This feature makes it unnecessary for the RAID controller 20 to perform a write operation to unlock the stripes.

Figure 3:
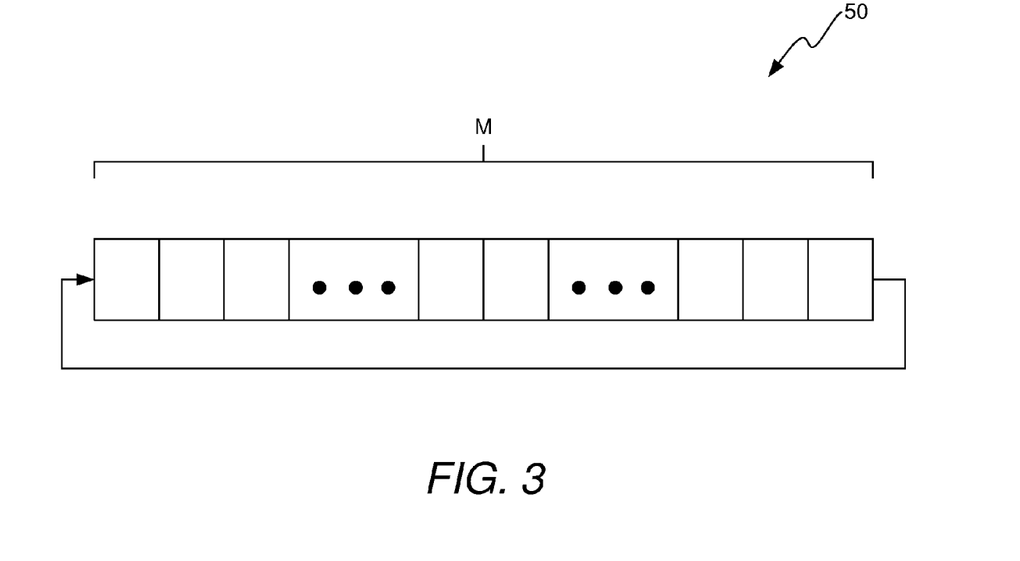
FIG. 3 illustrates a block diagram of the service memory device of the RAID system shown in FIG. 2 configured as a circular buffer.

FIG. 3 illustrates a block diagram of the service memory device 50 shown in FIG. 2 configured as a circular buffer. Implementing the service memory device 50 as a circular buffer effectively imposes an upper limit on the number of stripes that can be open at any given time and, as indicated above, obviates the need to write unlocks in order to close, or unlock, the stripes. Locks that were written earlier in time are simply overwritten by locks that are generated later in time. The circular buffer is large enough to store M locks, where M is an integer that is equal to or greater than N. The value of M is typically chosen by taking into account the following considerations: (a) the buffer should be at least large enough to store locks for all possible outstanding IO commands that the RAID controller 20 is capable of handling at any given time, and (b) the buffer should be large enough to allow IO commands to be executed out of order without overwriting any locks associated with any currently outstanding IO commands.

If M has a small value (e.g., equal to or slightly greater than N), then the amount of memory space that is needed for storing the locks is reduced, which is advantageous. The number of stripes that will have to be reconstructed if a failure occurs is also reduced, which is also advantageous. However, the RAID system 10 may stall when IO commands are handled out of order due to the fact that it may have to wait for all of the IO commands in a given block to be performed before it can queue a new batch of IO commands. If, on the other hand, M has a large value (i.e., several times the value of N), the RAID system 10 will not incur stalls, but more memory space will be required to store the locks. In addition, in the event of a failure, more stripes will need to be reconstructed. All of these considerations should be taken into account when choosing a value for M so that the chosen value achieves a balance that ensures that the RAID controller 20 will execute IO commands at a steady rate while avoiding block contentions and keeping the number of outstanding IO commands that are either completed or in progress within reasonable limits.

Figure 4:
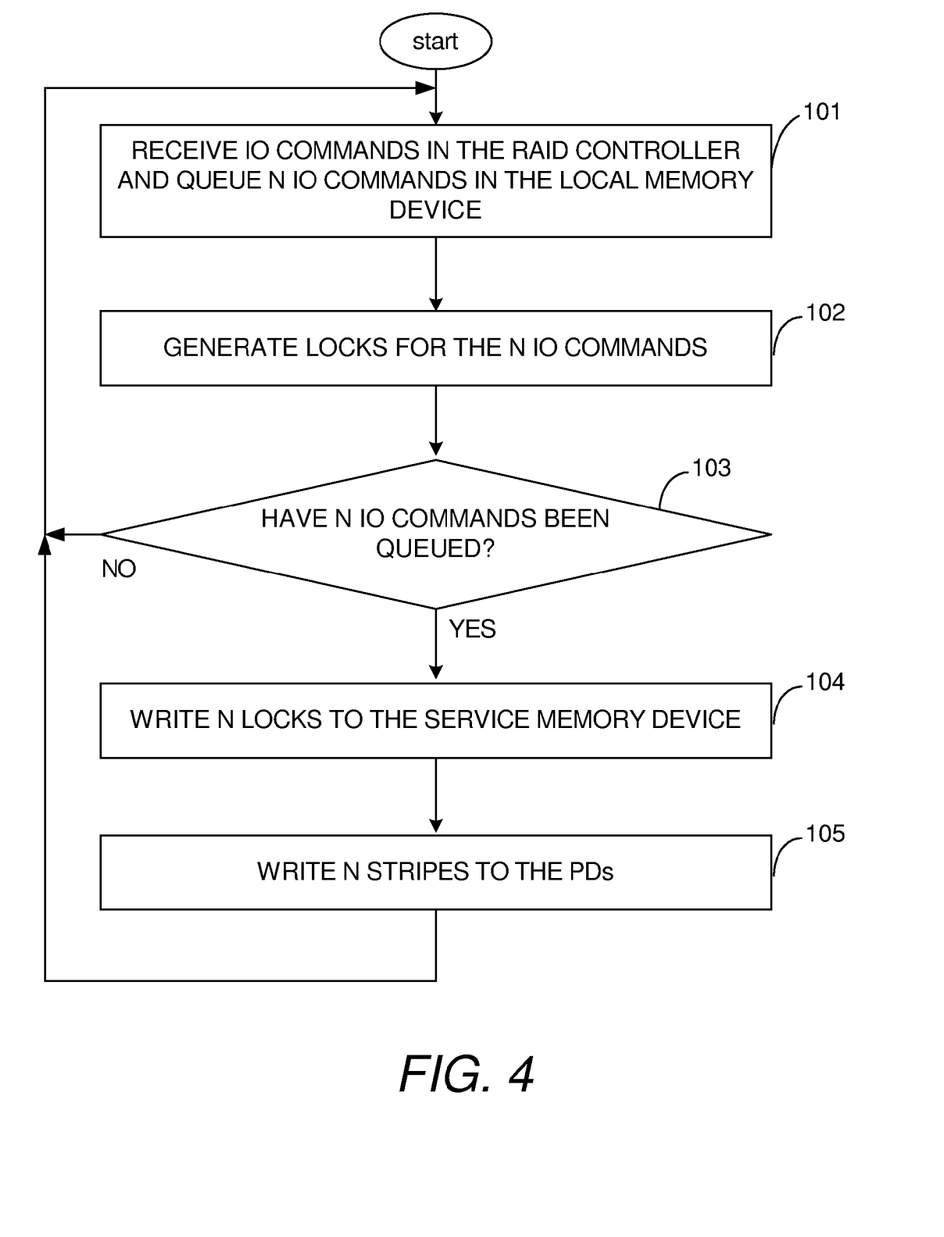
FIG. 4 is a flowchart that demonstrates a method performed by the RAID controller of the RAID system shown in FIG. 2 in accordance with an illustrative embodiment to prevent data corruption caused by the occurrence of write holes.

FIG. 4 is a flowchart that demonstrates the method performed by the RAID controller 20 shown in FIG. 2 in accordance with an illustrative embodiment. IO commands are received by the RAID controller 20 and queued in local memory device 40, as indicated by block 101. As the IO commands are received and queued, locks associated with the IO commands are generated by the RAID controller 20 and queued in local memory device 40, as indicated by block 102. As the processes of blocks 101 and 102 are being performed, a determination is made as to whether a predetermined number, N, of IO commands have been queued, as indicated by block 103. If not, the process returns to block 101. If so, the process proceeds to block 104. At block 104, the N locks are written to the service memory device 50 to lock the stripes. The process the proceeds to block 105 at which N stripes associated with the N queued IO commands are read from the local memory device 40 and written to the PDs 60. The process then returns to block 101 to receive and queue the next set of N IO commands.

It should be noted that while the method represented by the flowchart of FIG. 4 has been described with reference to the RAID system of FIG. 2, the method is capable of being performed by any RAID system configuration in which striping and parity are used. Also, while all of the steps of the flowchart are shown as being performed in a particular sequence, the method is not limited to being performed in this particular sequence. For example, some or all portions of the processes represented by blocks 101-103 may be performed in parallel. Those skilled in the art will understand that these and other modifications, additions or deletions may be made to the method represented by the flowchart and that all such modifications, additions or deletions are within the scope of the invention.

Figure 5:
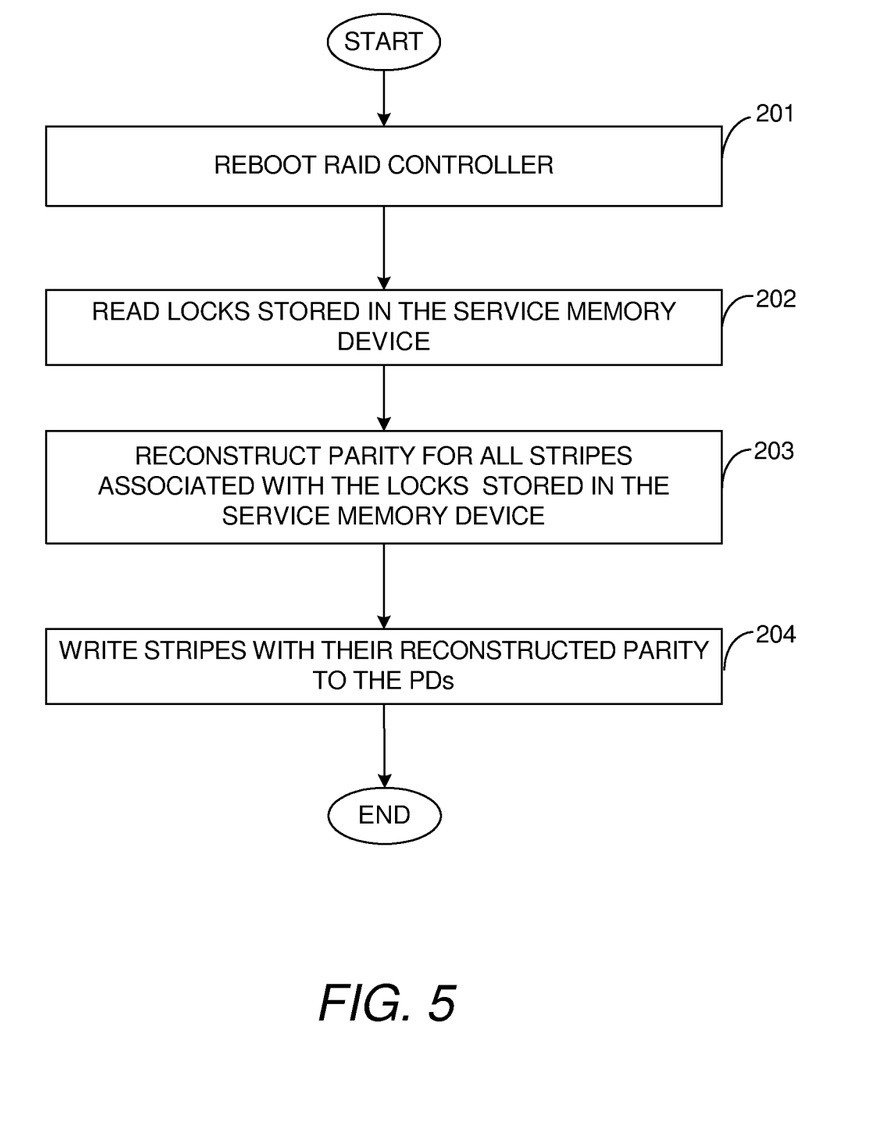
FIG. 5 is a flowchart that represents a reconstruction method performed by the RAID controller of the RAID system shown in FIG. 2 in accordance with an illustrative embodiment to reconstruct parity after the occurrence of a catastrophic event.

The invention also provides a method for reconstructing parity after a catastrophic event, such as a power failure, has occurred, as will now be described with reference to FIG. 5. FIG. 5 is a flowchart that represents the reconstruction method performed by the RAID controller 20 shown in FIG. 2 in accordance with an illustrative embodiment to reconstruct parity after the occurrence of a power failure. After a catastrophic event such as a power failure has occurred, the RAID controller 20 reboots, as indicated by block 201. Upon rebooting, the RAID controller 20 reads the locks that are currently stored in the service memory device 50, as indicated by block 202. The service memory device 50 is a nonvolatile memory device. As indicated above, there may be, for example, 2N locks stored in the service memory device 50. The RAID controller 20 then reconstructs parity for all of the stripes associated with all of the locks read from the service memory device 50, as indicated by block 203. The RAID controller 20 then causes the corresponding stripes with their reconstructed parity to be written to the PDs 60, as indicated by block 204.

Although some or all of the IO commands associated with the locks that are read from the service memory device 50 may have been complete at the time that the catastrophic event occurred, the method represented by the flowchart of FIG. 5 assumes that all of the stripes associated with the locks are corrupted. Therefore, the method reconstructs a number of stripes equal to the number of locks stored in the service memory device 50. This is, however, a relatively small number of stripes. For example, assuming that N=1024 and that the circular buffer 40 stores 2N=2048 locks, parity will be reconstructed for 2048 stripes. This is a very small number compared to known solutions, which typically require reconstruction of parity for millions or hundreds of millions of stripes after the occurrence of a catastrophic event.

In addition to preventing data corruption from occurring due to write holes without sacrificing performance, the invention also allows a significant reduction in the overall cost of a RAID level 5 system to be realized. As indicated above, the local memory device 40 need not be a nonvolatile memory device. This feature reduces the need for an NVRAM device in the RAID controller 20, which allows a significant cost reduction to be realized in the RAID system 10.

The methods represented by the flowcharts shown in FIGS. 4 and 5 may be implemented in hardware, software or firmware or a combination thereof. For any aspects of the methods that are implemented in software and/or firmware, the corresponding computer instructions are stored on a computer-readable medium (CRM), such as on the local memory device 40. The computer instructions are read out of the CRM and executed by the RAID processor 30. The invention is not limited to using any particular type of CRM for this purpose. A variety of different types of CRMs are suitable for use for this purpose including, but not limited to, magnetic disks and solid-state memory devices such as, for example, RAM devices, read-only memory (ROM) devices, programmable ROM (PROM) devices, erasable PROM (EPROM) devices, and flash memory devices.

It should be noted that the invention has been described herein with reference to a few illustrative embodiments for the purposes of describing the principles and concepts of the invention. The invention is not limited to the embodiments described herein, as will be understood by persons skilled in the art in view of the description provided herein. For example, while the invention has been described with reference to its use in a RAID level 5 system, the invention is not limited to use in a RAID level 5. The invention has been described with reference to RAID level 5 due to the benefits that the invention provides when used in RAID systems that utilize striping and parity. As will be understood by persons skilled in the art, the invention may also be used in RAID systems that utilize other levels of RAID. Also, the RAID controller may be a hardware or software RAID controller. These and other modifications to the embodiments described herein are within the scope of the invention, as will be understood by persons skilled in the art in view of the description provided herein.

What is claimed is:

1. A parity-based Redundant Array of Inexpensive Disks (RAID) system comprising:
    a RAID controller comprising:
        a processor; and
        a local memory device;
    a plurality of physical disks (PDs) in communication with the RAID controller;
    a nonvolatile service memory device in communication with the RAID controller; and
    wherein at least a portion of the local memory device is allocated for use as a queue for queuing N input/output (IO) commands received from a computer that is external to the RAID system, where N is a positive integer, and wherein the processor generates a lock associated with each received IO command and causes the received IO commands and the locks to be queued in the local memory device, and wherein the processor determines when N IO commands have been queued in the local memory device, and wherein when N IO commands have been queued, the processor causes the N respective locks associated with the N respective queued IO commands to be written to N respective lock storage locations of the service memory device, and wherein after the N respective locks have been written to the nonvolatile service memory device, the processor causes N respective stripes of data and parity bits associated with the N respective IO commands to be written to the PDs.

2. The parity-based RAID system of claim 1, wherein the nonvolatile service memory device comprises a circular buffer.

3. The parity-based RAID system of claim 2, wherein the circular buffer has M lock storage locations capable of storing M locks, where M is a positive integer that is equal to or greater than N.

4. The parity-based RAID system of claim 3, wherein M is greater than N.

5. The parity-based RAID system of claim 1, wherein the parity-based RAID system implements RAID level 5.

6. The parity-based RAID system of claim 1, wherein the local memory device is a volatile memory device.

7. The parity-based RAID system of claim 1, wherein if an electrical power failure occurs in the RAID system, then after electrical power is restored to the RAID system, the RAID controller reads the locks from the nonvolatile service memory device and reconstructs parity bits for each IO command associated with the locks read by the RAID controller from the nonvolatile service memory device.

8. A method for use in a parity-based Redundant Array of Inexpensive Disks (RAID) system for protecting against a potential for data corruption caused by an occurrence of a write hole, the method comprising:
   receiving input/output (IO) commands in a RAID controller of the RAID system from a computer that is external to the RAID system;
   in a processor of the RAID controller, generating a respective lock for each respective IO command received in the RAID controller;
   in a local memory device of the RAID controller, queuing N of the received IO commands and N of the locks associated with the N IO commands, where N is a positive integer;
   in the processor of the RAID controller, determining when N IO commands have been queued in the local memory device, and, when N IO commands have been queued, causing the N locks associated with the N queued IO commands to be written to N respective lock storage locations of a service memory device of the RAID system; and
   in the processor of the RAID controller, after the N respective locks have been written to the service memory device, causing N respective stripes of data and parity bits associated with the N respective IO commands to be written to physical devices (PDs) of the RAID system.

9. The method of claim 8, wherein the service memory device is a circular buffer.

10. The method of claim 9, wherein the circular buffer has M lock storage locations capable of storing M locks, where M is a positive integer that is equal to or greater than N.

11. The method of claim 10, wherein M is greater than N.

12. The method of claim 8, wherein the RAID system implements RAID level 5.

13. The method of claim 8, wherein the local memory device is a volatile memory device.

14. The method of claim 8, further comprising:
   in the processor of the RAID controller, if an electrical power failure occurs in the RAID system, when electrical power is restored to the RAID system, performing a reboot process to reboot the processor; and
   in the processor, after the processor reboots, performing a reconstruction process that reads the locks that are stored in the service memory device from the service memory device and reconstructs parity bits for each IO command associated with the locks read from the service memory device.

15. A non-transitory computer-readable medium (CRM) having a computer program embodied thereon for use in a parity-based Redundant Array of Inexpensive Disks (RAID) system for protecting against a potential for data corruption caused by a potential occurrence of a write hole, the non-transitory CRM comprising:
   a first set of computer instructions for receiving input/output (IO) commands in a RAID controller of the RAID system from a computer that is external to the RAID system;
   a second set of computer instructions for generating a respective lock for each respective IO command received in the RAID controller;
   a third set of computer instructions for queuing N of the received IO commands and N of the locks associated with the N IO commands in a local memory device of the RAID controller, where N is a positive integer;
   a fourth set of instructions for determining when N IO commands have been queued in the local memory device, and, when N IO commands have been queued in the local memory device, for causing the N locks associated with the N queued IO commands to be written to N lock storage locations of a service memory device of the parity-based RAID system; and
   a fifth set of instructions for causing N respective stripes of data and parity bits associated with the N respective IO commands to be written to physical devices (PDs) of the RAID system after the N respective locks have been written to the N lock storage locations of the service memory device.

16. The non-transitory CRM of claim 15, further comprising:
   a sixth set of instructions for performing a reconstruction process after an electrical power has occurred and electrical power has been restored to the RAID system, the sixth set of instructions reading the locks that are stored in the service memory device from the service memory device and reconstructing parity bits for each IO command associated with the locks read from the service memory device.

* * * * *